United States Patent [19]

Powell et al.

[11] Patent Number: 4,753,629
[45] Date of Patent: Jun. 28, 1988

[54] CAM DRIVEN HEM SEALER

[75] Inventors: Earle R. Powell, Jacksonville; Gerald E. Rawlings, Waverly, both of Ill.

[73] Assignee: Mobil Oil Corporation, New York, N.Y.

[21] Appl. No.: 921,580

[22] Filed: Oct. 22, 1986

[51] Int. Cl.⁴ .................. B31B 23/64; B31B 23/86
[52] U.S. Cl. .................... 493/193; 493/206; 493/207; 493/209; 493/225; 493/394; 493/928; 156/583.1; 156/583.3; 156/583.8
[58] Field of Search ............... 493/205, 206, 207, 208, 493/209, 189, 190, 191, 192, 193, 197, 202, 225, 226, 381, 386, 394, 406, 470, 471, 928; 156/582, 583.1, 583.4, 583.7, 583.8, 583.9, 583.91

[56] References Cited

U.S. PATENT DOCUMENTS

| | | | |
|---|---|---|---|
| 1,311,560 | 7/1919 | Horsey | 156/583.8 |
| 2,624,389 | 1/1953 | Bungay | 156/583.9 |
| 2,777,491 | 1/1957 | Ashton et al. | 493/226 |
| 2,883,913 | 4/1959 | Piazze | 493/226 |
| 2,897,729 | 8/1959 | Ashton et al. | 493/225 |
| 3,196,068 | 7/1965 | Shoder et al. | 156/583.9 |
| 3,741,080 | 6/1973 | Kuhnle et al. | 493/202 |
| 4,016,021 | 4/1977 | La Fleur | 493/209 |
| 4,622,798 | 11/1986 | Oki | 156/583.1 |

FOREIGN PATENT DOCUMENTS 2097720 11/1982 United Kingdom ............ 156/583.1

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

An improved thermoplastic film heat bonding apparatus includes a heated seal bar, a support member supporting the heated seal bar for reciprocating motion against a platen and a resilient coupling between the support member and the heated seal bar to allow deflection of the heated seal bar with respect to the support member providing better conformance between the platen and the face of the seal bar contacting the platen for more uniform and repeatable heat seals. Springs are used to provide the resilient coupling between the support member and the heated seal bar. One mounting providing both resilient coupling and continuous adjustable spacing between the support member and the heated seal bar includes a bracket supporting a threaded member passed through the support member and a coil spring biasing the bracket and support member apart. The bracket is itself resiliently mounted to the heated seal bar also by compression coil springs. Further contributing to improved registration between the heated seal bars and the platen is a flexible, cantilever mounting of the platen. The heated seal bar support member is mounted on a support arm rotationally mounted at one end and biased against a cam at an opposing end. Rotation of the cam pivots the support arm back and forth reciprocating the support member and heated seal bar against the platen.

11 Claims, 5 Drawing Sheets

CAM DRIVEN HEM SEALER

BACKGROUND OF THE INVENTION

The invention relates to high speed continuous draw tape plastic bag manufacture and, in particular, to a cam driven reciprocating thermoplastic film heat sealing apparatus.

U.S. patent application Ser. No. 652,254, now U.S. Pat. No. 4,624,654, assigned to the assignee of this invention, describes a method and apparatus for manufacturing plastic film draw tape bags. That application and all related applications disclosed therein are incorporated by reference herein.

The aforesaid U.S. patent application discloses a method of and apparatus for manufacturing draw tape bags in which a medianly folded, continuous length of plastic film is continuously advanced from a feed roll through a hemming device for inwardly turning the adjoining free edges of the film, a punch for punching openings through the hemmed edges of the film at regular intervals, and a device for inserting continuous plastic draw tape strips into each hem of the continuously moving web. The web with draw tape strips is then fed through a reciprocating heat sealer for sealing the hems and a reciprocating transverse sealing and cutting device for sealing and cutting individual bag bodies from the continuous length of film. A dancer between the draw tape strip feeding device and the heat sealer accumulates the continuous fed film web and draw tape strips for intermittent advances of the web and strips through the downstream portion of the line.

In one type of known reciprocating bar sealer, a pair of opposed elongated heated bars are positioned one above the other on either side of a platen, to receive a pair of lengths of thermoplastic film therebetween. The bars are supported, moved and guided solely by a pair of air cylinders, each coupled to the middle of a separate one of the bars. This construction results in two major types of problems. First, because of the loads to which they are subjected, the air cylinders quickly wear and must be regularly replaced. In continuous production, air cylinders may require replacement as frequently as once per day. Second, it is difficult if not virtually impossible to obtain alignment of the bars in contact with the plastic sheet. This results in skips or gaps and unevenness in the heat seal. This is true even where the platen is covered with a cushioning material such as a silicon rubber layer.

Another type of known prior art reciprocating bar sealer employs a single air cylinder to reciprocate both bars along guides by linkages. The seal bars are rigidly mounted with the air cylinder through the linkages. Some slight improvement is had.

It would be useful to provide a reciprocating bar heat sealer automatically compensating for alignment as well as slight machining errors.

It would be desirable to improve the effective cycling rate of reciprocating heated bar sealers for higher manufacturing rates.

SUMMARY OF THE INVENTION

The invention is a reciprocating, heated bar sealing apparatus for sealing thermoplastic film which is mounted to a stationery frame that typically supports other work stations along a manufacturing line.

It is a first object of the invention to provide a reciprocating heated bar thermoplastic film sealing apparatus which provides a more uniform and repeatable heat seal.

It is yet another object of the invention to provide an improved heat seal bar mounting in an apparatus which automatically adjusts for minor misalignments between the seal bar and the platen and minor machining errors.

It is yet another object of the invention to provide an improved heat seal bar mounting in an apparatus reciprocating the bar against a platen for producing more uniform and repeatable heat seals in continuous operation.

These and other objects are accomplished, according to the invention, by a thermoplastic film heat sealer apparatus which includes a heated seal bar, a platen opposing the seal bar, and an actuator for reciprocating the seal bar toward and away from the platen by the provision of a resilient coupling between the seal bar and the actuator. The resilient coupling includes a spring. In one embodiment the spring resiliently biases a support arm of the actuator against the seal bar. In the preferred embodiment, a spring biases the seal bar and the support arm apart. The preferred resilient coupling includes a bracket positioned adjoining the seal bar. The spring is located between the bracket and the support arm resiliently biasing the support arm away from the bracket and the seal bar. An adjustable coupling is provided between the support member and the bracket by a threaded stud extending from the bracket which allows adjustment of the spacing between the seal bar and the support over a continuous range. Additional compression springs bias the bracket against the heated seal bar. In the preferred embodiment, a pair of brackets, resiliently mounted between the seal bar and the support member, are provided for even greater stability and adjustment.

It is an object of the invention to provide a reciprocating heat seal bar apparatus providing more uniform sealing.

It is yet another object of the invention to provide a reciprocating heat seal bar apparatus that can maintain uniform sealing at higher operating speeds than heretofore possible.

The apparatus of the subject invention includes a first support member having an end rotatably supported from a stationary frame. The support member supports a seal bar facing a platen. A cam is provided between the two support members for reciprocating rotating the support member about its rotatably thereby reciprocating the seal bar away from and then towards the platen. In the preferred embodiment a second support member and heated seal bar are identically provided on an opposing side of the platen.

Other important features of the invention, which are believed to contribute to its superior performance, are that the cam is located between opposing ends of the support members opposite the first, supported ends of those members and, further, that the seal bars are supported on the support members between the cam and the first ends of the support members where the members are rotatably supported from the frame.

Another feature which is believed important to the success and reliability of the subject invention is the vertical orientation of the apparatus. According to this aspect of the invention, a continuous elongated plastic film web is directed vertically through the apparatus. The first end of each support member rotates horizontally about a vertical axis of rotation. This balances the forces which must be applied to the support members for reciprocating the members and their sealing bars.

BRIEF DESCRIPTION OF THE DRAWINGS

The aforesaid objects and other advantages of the subject invention will be apparent from the following description of the preferred embodiment and the accompanying drawings in which.

DETAILED DESCRIPTION OF THE INVENTION

Figure 1:
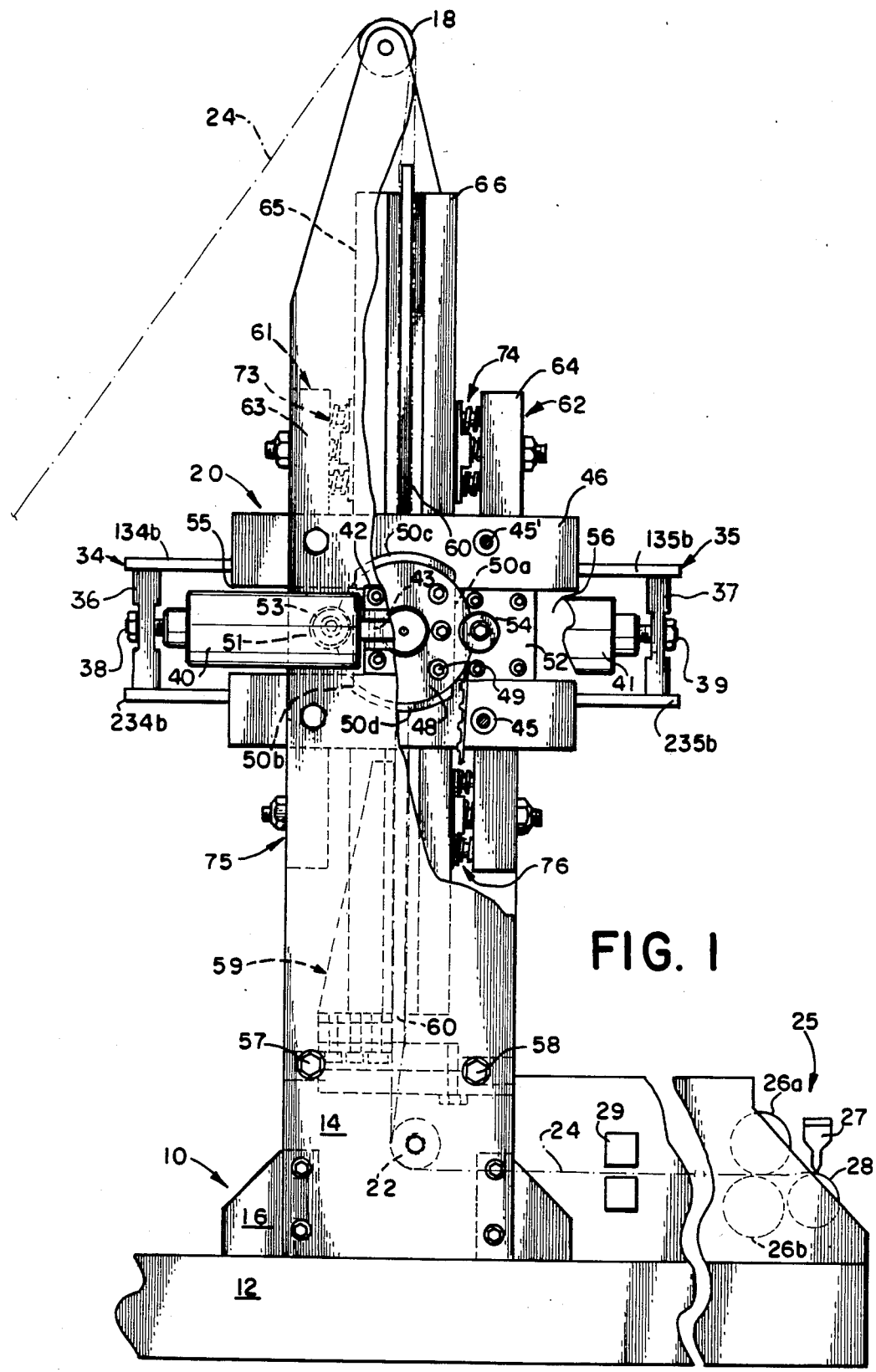
FIG. 1 is a partially sectioned side elevation of the preferred embodiment reciprocating heated bar thermoplastic film sealer of the invention.

Referring to FIG. 1, a stationary frame 10 is provided for supporting the components of the apparatus and includes a horizontal member 12, a vertical member 14 extending upwards from the horizontal member 12 and joined with that member by suitable means such as one or more plates 16 overlapping and bolted through both members 12 and 14. The vertical member 14 and a hidden vertical counterpart support between them an idler roller 18 at their uppermost end, the hem sealing device of the subject invention, indicated generally by the reference numeral 20, and another idler roller 22 positioned beneath the hem sealer 20. A continuous plastic film web 24 to be longitudinally heat sealed passes over idler 18, through the sealer 20 and around idler 22 to a conventional indexing bag machine. Such machines are commercially available from various U.S. manufacturers such as FMC Corporation. The bag machine, indicated diagrammatically and identified by reference numeral 25, includes a pair of nip rolls 26a and 26b which draw the plastic film 24 through the hem sealer 20 and pass it to a combination heat sealing/cutting bar 27 reciprocated against a support roller 28. The bag machine 25 includes a rotary, indexing drive (not depicted for clarity) coordinating the intermittent operation of nip rolls 26a and 26b, which index a bag length or bag width of film 24 past the sealing/cutting bar 27, with the reciprocating motion of that member 27. The hem sealer 20 is also driven from the bag machine 25 indexing drive by a train of belts and pulleys which are conventional and which are also omitted from FIG. 1 for clarity. One or more presealer units 29 may be positioned between the lower roller 22 and the bag machine 25 to provide heat seals through the hemmed region of the thermoplastic film 24 where six or more thickness of film are built up.

Figure 6:
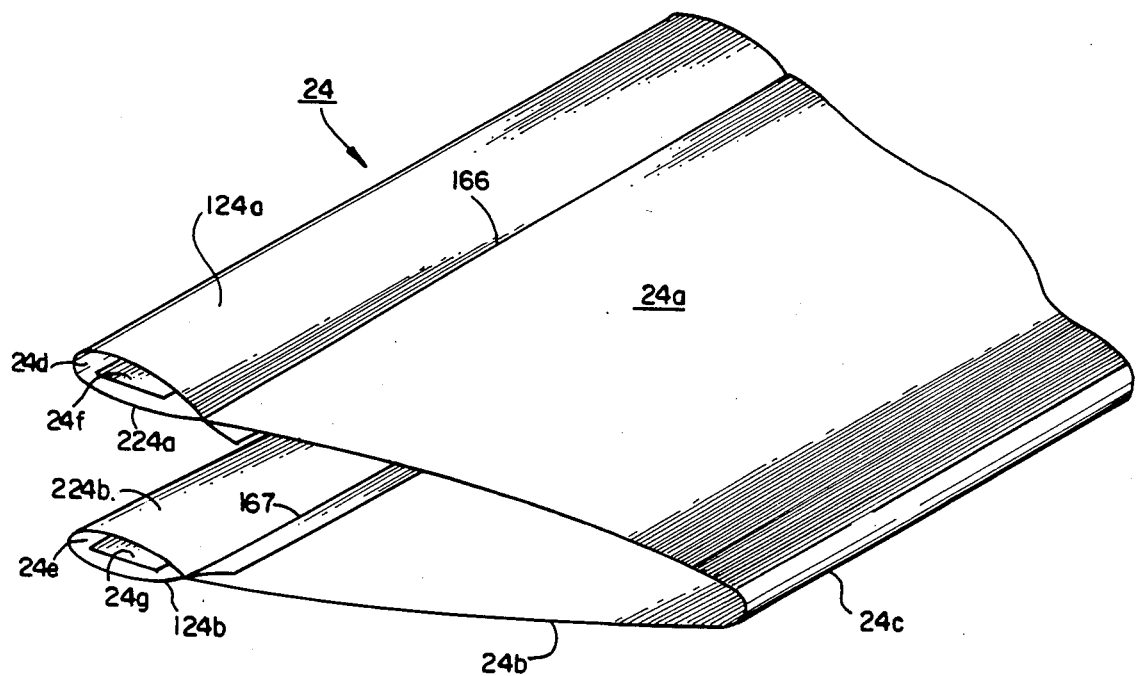
FIG. 6 is a diagrammatic perspective view of the plastic film web fed through the sealer.

FIG. 6 depicts the continuous thermoplastic film web 24 passed through the hem sealer 20. The web 24 has two halves 24a and 24b joined at one end 24c. A pair of continuous, longitudinally extending, inwardly turned hems 24d and 24e are provided, one in each of the halves 24a and 24b, opposite the joined end 24c. Continuous plastic film strips 24f and 24g, which will form the draw tape strips of the plastic bags ultimately manufactured, are positioned in each hem 24d and 24e, respectively. The hem sealer 20 forms longitudinally extending continuous heat seals, indicated by lines 166 and 167, respectively, joining the panel portion 124a with hem panel portion 224a and panel portion 124b with hem panel 224b, respectively. The components of the web 24 are separated in the figure for clarity.

Figure 2:
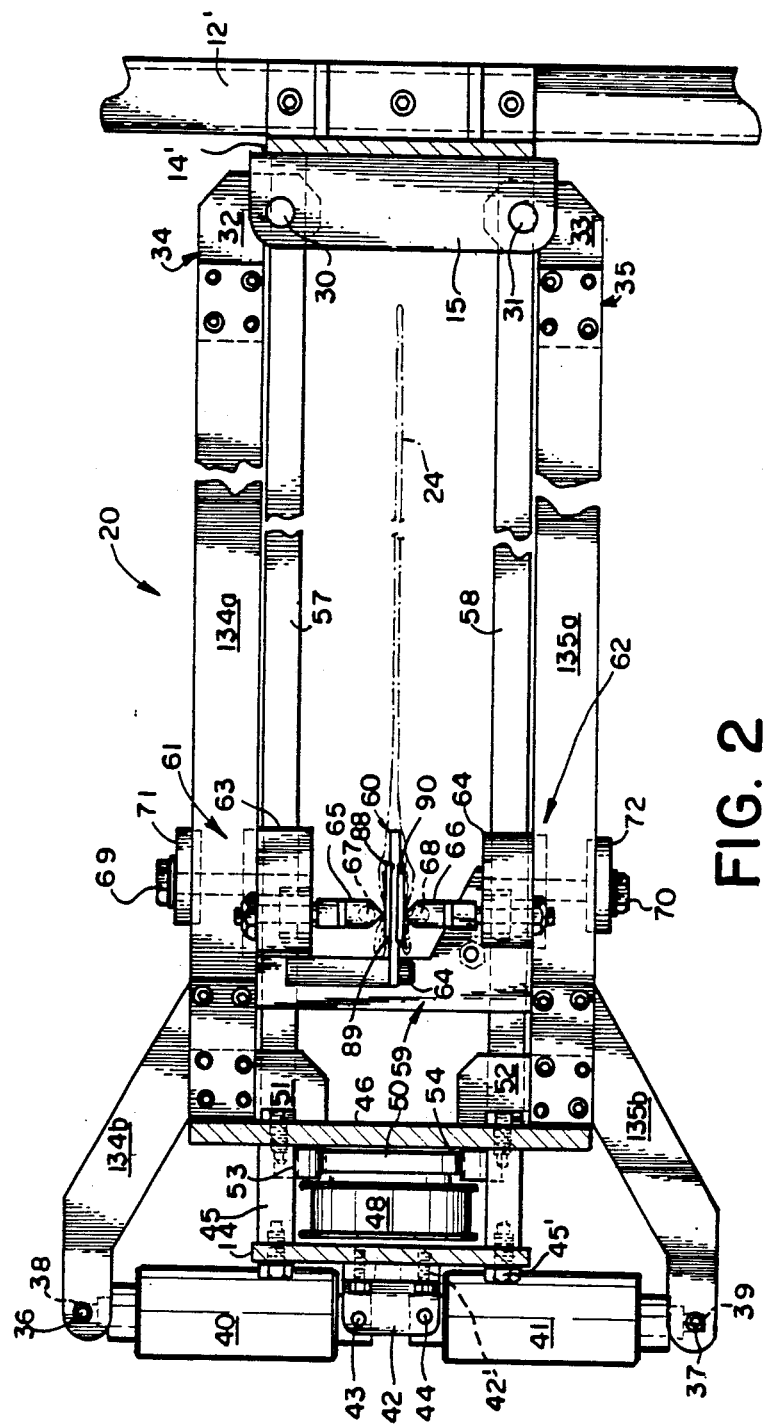
FIG. 2 is a localized plan view of the apparatus 20 of FIG. 1.

Refer now to FIG. 2, a plan view of the hem sealer device 20. Many of the components of hem sealer 20 to be described with respect to FIG. 2 will also be found in FIGS. 1 and 3. A second vertical member 14' parallel with 14 supports a bracket 15 which pivotally supports about vertical axles 30 and 31, blocks 32 and 33, respectively, at one end of each of two identical support arm assemblies 34 and 35, respectively, for pivotal movement of the arms 34 and 35 in a common horizontal plane (the plane of FIG. 2). The blocks 32 and 33 are bolted between upper plate members 134a and 135a and symmetric lower plate members (not seen). Upper plate members 134b and 135b are joined with symmetric lower plate members 234b and 235b (seen only in FIG. 1) and with plate members 134a, and 135a and their symmetric counterparts at blocks 51 and 52. An opposing end of each of the arm assemblies 34 and 35, respectively, pivotally supports an axle 36, 37 receiving a piston stem 38, 39, respectively, of one of a pair of identical, opposed air cylinders 40 and 41, respectively. A bracket 42 is joined with the vertical frame member 14 by suitable means such as bolts 42'. Bracket 42 supports a pair of axles 43 and 44, each of which receives and pivotally supports a remaining end of each of the air cylinders 40 and 41, respectively. A second vertical plate 46 is supported by the vertical member 14, spaced from the inner side of the vertical frame member 14 opposite bracket 42, by means of four bored and tapped collars 45 and bolts 45' rotatably supports with frame member 14 on a common axle, a rotatable drive pulley 48 and an adjoining cam 50.

As is best seen in FIG. 1, the cam 50 is coupled to the drive pulley 48 by suitable means such as bolts 49. As is also best seen in FIG. 1, the cam 50 has two opposing parallel flat sides 50a and 50b, respectively, connected by opposing cylindrical section sides 50c and 50d.

Referring to both FIGS. 1 and 2, blocks 51 and 52 each support cam followers 53 and 54, respectively. The air cylinders 40 and 41 are maintained under constant air pressure to bias the arms 34 and 35 together and the cam followers 53 and 54 against the cam 50. Cutouts 55 and 56 (seen only in FIG. 1) are provided in the plate member 46 to accommodate the movement of the cam followers 53 and 54.

Figure 3:
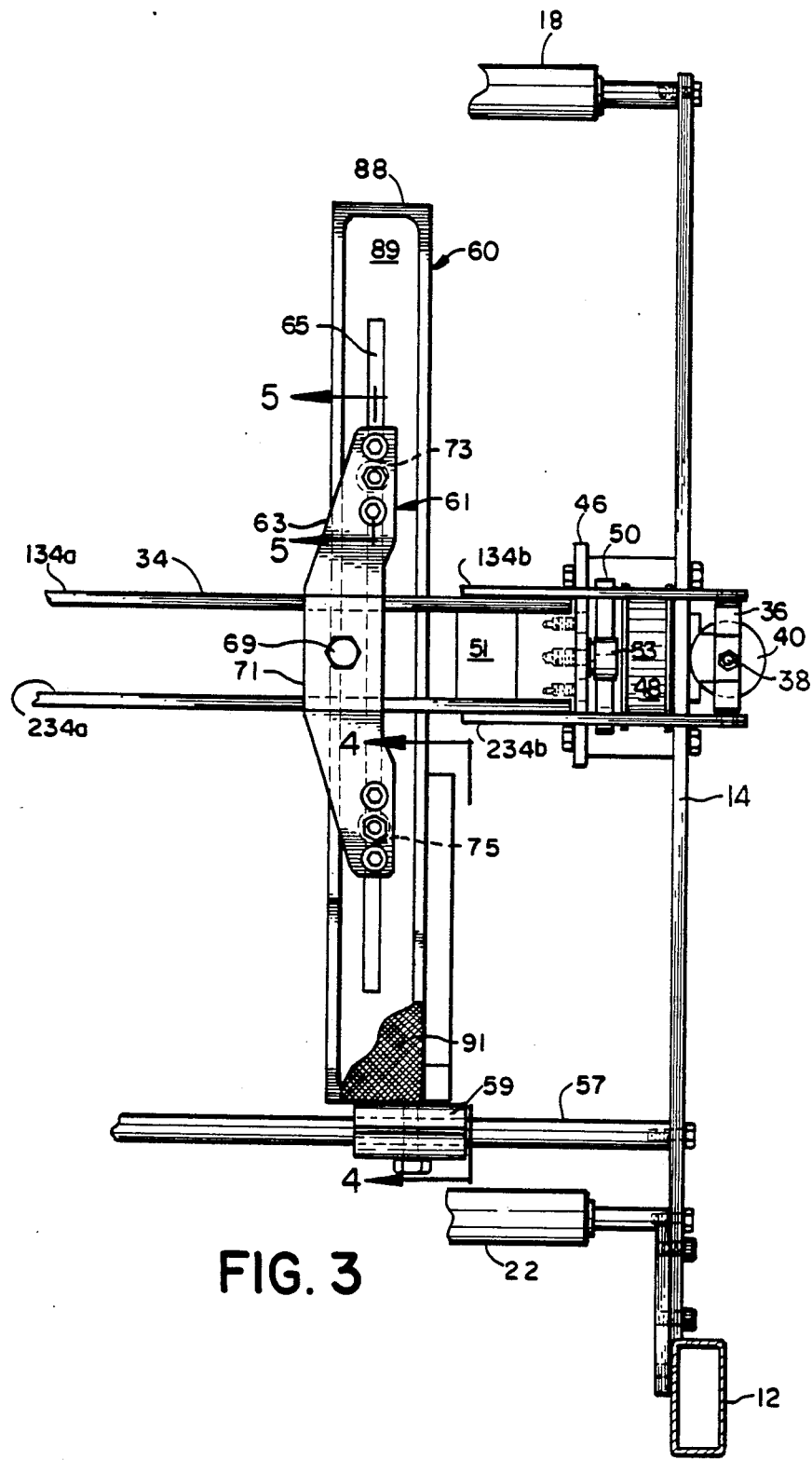
FIG. 3 is a localized side elevation view of the left side of the apparatus of FIG. 1.

Referring again to FIGS. 1 and 2, a pair of shafts 57 and 58 span the vertical members 14 and 14' beneath the support arms 34 and 35. The shafts 57, 58 support a bracket assembly 59 which supports, in a cantilever fashion and in an elongated vertical direction, a planar, rectangular platen 60. Supported on either major planar side of the platen 60 from each arm 34, 35 is a seal bar assembly 61, 62, respectively. Each assembly 61, 62 includes an elongated support member 63, 64, respectively, mounting an elongated, heated seal bar 65, 66, respectively. Each seal bar 65, 66 include a tubular electric heater element 67, 68, respectively, (depicted only in FIG. 2) extending through the length of each bar 65, 66 in its elongated direction. The electrical connections of the tubular electric heater element 67, 68 at the ends of each of the heated seal bars 65, 66 are conventional and are omitted for clarity. Referring now to FIG. 2, each bar support member 63, 64 is held against an inner side of d the arm assembly 34, 35, respectively, by means of a bolt 69, 70, and bracket 71, 72, respectively. This mounting allows the seal bar 65, 66 of the plate members assemblies 61 and 62 to positioned at any desired position along the support arms 34, 35. The mounting of the seal bar assembly 61 to support arm assembly 34 is depicted in FIG. 3 in an orthogonal view to FIG. 1. The parallel plate members 134a and 234a of arm assembly 34 are clearly seen. The support member 63 is planar parallel with the plane of FIG. 3. A swept wing shape is provided to the member 63 to allow the assembly to be positioned as close to the cam 50 as possible.

As is best seen in FIG. 1, heated bar 66 is attached to support member 64 by a pair of identical resilient coupling assemblies 74 and 76. A second pair of identical resilient coupling assemblies 73 and 75 are provided for joining the other support member 63 with the other heated seal bar 65. (See FIG. 3 also) One of the identical assemblies, resilient coupling assembly 73 joining the support member 63 and seal bar 65 is depicted in FIG. 5.

Figure 5:
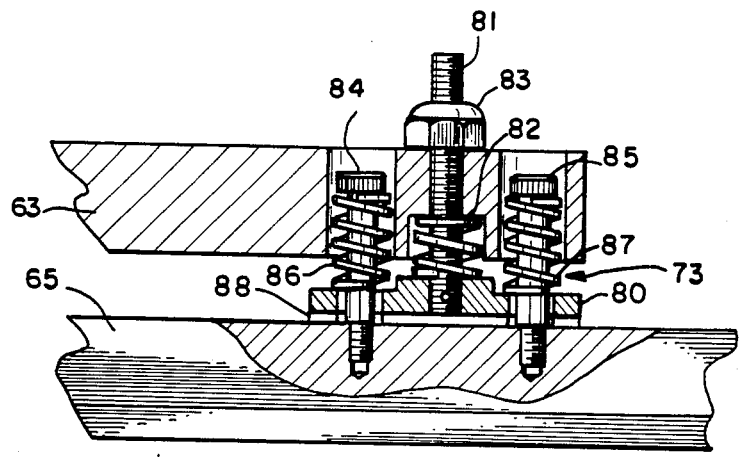
FIG. 5 is a localized sectional view of the flexible, heated seal bar mounting assembly along the lines 5—5 of FIG. 3.

In FIG. 5, the resilient assembly 73 includes a bracket in the form of a stepped plate 80 supporting a stud 81 and a surrounding compression coil spring 82. The support member 63 is suitably bored on a surface facing the heated seal bar 65 to receive the remaining end of the coil spring 82 and the stud 81. Coil spring 82 resiliently biases the support arm 63 away from the bracket 80 and seal bar 65, the spacing distance being adjusted by means of a nut 83. A pair of bolts 84 and 85 are passed through the bracket 80 on either side of the stud 81 and into tapped bores in the seal bar 65. Each bolt holds a coil spring 86 and 87, respectively, in compression, resiliently biasing the bracket 80 against the seal bar 65. Openings in the bracket 80 through which the bolts 84 and 85 pass are elongated along the elongated dimension of the heated seal bar 65 to allow for differential thermal expansion of the bar 65 and support member 64. The support member 63 is also bored therethrough to receive the upper ends of the bolts 84, 85 and compression springs 86, 87. A thermal insulator layer 88 is provided to minimize heat loss from the seal bar 65 to the bracket 80 and support member 63.

As is seen in FIG. 3, platen 60 is formed by a substantially rectangular steel member 88 having essentially rectangular, elongated, ⅛" inch deep cutout on its exposed major planar surface facing the heated seal bar 65 receiving an approximately ⅛" thick silicon rubber pad 89 cemented into the cutout facing the seal bar 65. At least that portion of the platen 60 to be contacted above by the thermoplastic film 34 is covered with Teflon cloth 91 as is conventionally provided on the platens of these types of devices. Only a portion of the cloth 91 covering platen 60 is depicted in FIG. 3 for clarity.

Figure 4:
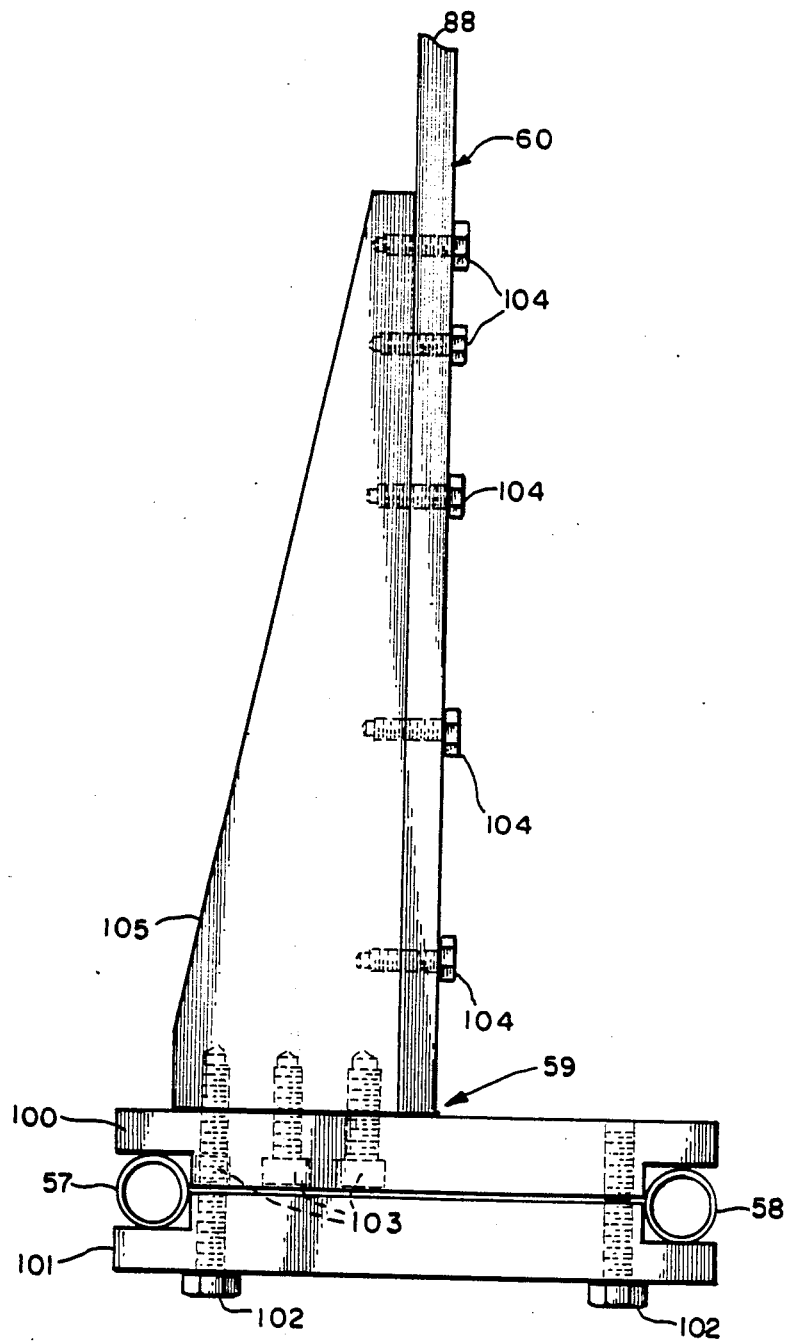
FIG. 4 is a localized side elevation of the platen mounting along lines 4—4 of FIG. 3.

As in seen in FIG. 2, the opposing major planar side of platen 60 facing bar 66 supports a cushioning pad 90 in an identified cutout. FIG. 4 depicts the cantilever mounting of the platen 60. The bracket assembly 59 includes upper and lower bracket members 100 and 101, respectively, each having a cutout at either innerfacing end thereof to receive the hollow bar members 57 and 58 spanning the vertical frame members 14 and 14' (not depicted). The bracket halves 100 and 101 are held together by bolts 102 and 103 passing through the lower bracket 101 into threaded bores in the upper bracket 100. A triangular shaped plate member 105 is supported on the upper surface of the upper bracket 100 and held in place by countersunk bolts 103 (indicated in phantom) which are received in threaded bores extending into the bottom of the plate 105. The plate member 88 of platen 60 is positioned against a vertical side edge of the plate member 105 and joined with that member by five bolts 104 passing through smooth bores in the plate member 88 into threaded bores in the plate member 105.

The resilient coupling assemblies between the heat seal bars and their support members and the cantilever mounting of the platen provide a great deal of flexibility enabling the seal bars 65 and 66 to seat more regularly and uniformly on the platen 60 than did known reciprocated heated bar sealers previously discussed.

The operation of the sealer 20 is straightforward. The web 24 to be hem sealed is passed over roller 18, separated at the platen 60 with each half 24a and 24b passed along either major planar side of the platen 60, brought together beneath the sealer device 20 and passed around lower roller 22 and through any presealers 29 to the conventional bag machine 25. The air cylinders 40 and 41 are reversed connected to cause the support arm assemblies 34 and 35 to pivot away from one another when air pressure is removed from the cylinders 40 and 41 and they are opened to the atmosphere. When the cylinders 40 and 41 are pressurized, they pivot the arms 34 and 35 together. The cam 50 cyclingly pivots the arms 34 and 35 together and apart, reciprocating the heated seal bars 65 and 66 with respect to the platen 60. The arm movement is stopped either by the cam followers 53 and 54 contacting the cylindrical proportions 50c and 50d of cam 50 or by the heated seal bars 65 and 66 contacting the opposite sides of the platen 60 when the cam followers 53 and 54 adjoin the planar portion 50a, 50b of the cam 50. The cam is driven by connected pulley 48 coupled by means of suitable belts and other pulleys (not depicted) to a main rotary index drive for the bag machine 25 or its own rotary drive (neither depicted). The cam 50 is rotated 180° during each index cycle of the bag machine. In other words, two bag bodies are sealed and severed by the bag machine 25 for each 360° rotation of the cam 50.

One of ordinary skill in the art will recognize that the quality of the seal provided by the hem sealer 20 for a given thermoplastic material, will vary with heat, pressure and dwell of the heated seal bar 65 and 66. The described machine has been successfully cycled, without film at speeds up to 180 cycles per minute. The resilient mounting assemblies have been adjusted to provide an approximately 5/16" gap between the pointed ends of the seal bars and the adjoining surfaces of the platen, when the support arms 34 and 35 are spread by the cylindrical portions of the cam 50, to seal thermoplastic films having a thickness between about 1.02 and 1.6 mils in the film web configuration previously described with respect to FIG. 6 to make draw tape bags.

A preferred resilient coupling for adjoining each of the heated seal bar 65, 66 with their adjoining support members 63 and 64, respectively, has been described but less versatile variations might be employed. For example, the bracket 80 bolts 84 and 85 and springs 86 and 87 might be eliminated and the stud 81 threaded directly to the heated seal bar to provide a simpler, adjustable resilient coupling between the support member and the heated seal bar. This type of mounting might be further modified by addition of a coil spring to the opposing side of the support member.

The preferred embodiment device is designed for hem sealing of a continuous web. The support arms are horizontally rotated and the heated seal bars vertically oriented to save space along the manufacturing line and to subject both panels of the continuous thermoplastic film and both reciprocating support arms of the heated bar sealer to equal gravitational loads. However, other orientations such as vertically hung and rotatable heated seal bar support arms, would be possible for other applications.

Although a preferred embodiment of the invention has been described, various modifications and improvements will occur to one of ordinary skill in the art. Therefore the invention is not limited by the described embodiment but rather is set forth in the accompanying claims.

We claim:

1. Apparatus for thermally bonding continuous lengths of adjoining layers of thermoplastic film comprising:
   a stationary frame;
   an elongated support member pivotally mounted at one of the ends thereof on said frame and having a cam follower at the other end thereof;
   a heated seal bar carried by said elongated support member intermediate the ends thereof;
   adjustable means for supporting said heated seal bar at any selected position along said elongated support member;
   a stationary platen adjustably supported on said frame and positioned in opposing relation to the heated seal bar; and
   rotatable cam means operatively coupled with said cam follower at the other end of the support member for cyclicly pivoting said support member about said one end for reciprocating said heated seal bar with respect to said platen to thermally bond adjoining layers of the thermoplastic film therebetween.

2. The apparatus of claim 1 wherein the heated seal bar and the platen each have an elongated dimension normal to a plane in which said support member pivots.

3. The apparatus of claim 1 further comprising:
   spring means for resiliently biasing the heated seal bar away from the support member.

4. The apparatus of claim 1 further comprising:
   a bracket between the support member and heated seal bar;
   first spring means resiliently biasing the bracket away from the support member; and
   second spring means resiliently biasing the bracket against the heated seal bar.

5. The apparatus of claim 1 further comprising:
   resilient coupling means between the support member and the heated seal bar for allowing displacement between the support member and the heated seal bar when the heated seal bar contacts the platen.

6. The apparatus of claim 5 further comprising:
   continuous spacing adjustment means between the support member and heated seal bar for adjusting the static spacing between the support member and heated seal bar when the heated seal bar is withdrawn from the platen.

7. The apparatus of claim 6 wherein said continuous spacing adjustment means comprises:
   a threaded member extending between said heated seal bar and support member; and
   said resilient coupling means comprises:
   a compression coil spring positioned around said threaded member and between said support member and said heated seal bar.

8. The apparatus of claim 7 wherein said resilient coupling means further comprises:
   a bracket supporting said threaded member; and
   spring means for resiliently biasing said bracket against said heated seal bar.

9. The apparatus of claim 1 further comprising:
   a second elongated support member pivotally mounted on one of the ends thereof to the stationary frame;
   a second heated seal bar adjustably coupled with the second support member intermediate the ends thereof and adjoining the platen on a side opposite the side cooperating with the first-named heated seal bar; and
   wherein said cam means is operatively coupled with the other end of said second support member and cyclingly pivots said second support member to reciprocate the second heated seal bar with respect to the platen concurrently to thermally bond adjoining layers of thermoplastic film between the opposite sides of the platen and the respective heated seal bars.

10. The apparatus of claim 9 wherein said support members are mounted for rotation in a common horizontal plane and said heated seal bars are elongated in a direction normal to said plane.

11. The apparatus of claim 3 further comprising:
    means at an end of the support member opposite the one end for simultaneously biasing the support member against the cam means and the heated seal bar against the platen.

* * * * *